United States Patent [19]

Regelson

[11] 3,812,248

[45] May 21, 1974

[54] ANTI-HERPES VIRUS TREATMENT
[75] Inventor: William Regelson, Richmond, Va.
[73] Assignee: Hercules Incorporated, Wilmington, Del.
[22] Filed: Jan. 14, 1972
[21] Appl. No.: 218,026

Related U.S. Application Data

[63] Continuation of Ser. No. 54,022, July 10, 1970, abandoned, and a continuation-in-part of Ser. No. 716,257, March 6, 1968, abandoned, and a continuation-in-part of Ser. No. 577,675, Sept. 7, 1966, abandoned.

[52] U.S. Cl. .................................................. 424/78
[51] Int. Cl. ............................................. A61k 27/00
[58] Field of Search .................................... 424/78

[56] References Cited
UNITED STATES PATENTS
3,224,943  12/1965  Espy ..................................... 424/78
3,624,218  11/1971  Regelson ............................. 424/78

OTHER PUBLICATIONS

Antibiotic News, Vol. 5, No. 9, Oct. 1968, pages 1 and 2.

Primary Examiner—Jerome D. Goldberg
Attorney, Agent, or Firm—Marion C. Staves

[57] ABSTRACT

Certain water-soluble copolymers prepared from divinyl ether and maleic anhydride have been found to suppress herpes virus. Administration of said copolymers not only suppresses growth in infected animals but also increases resistance to virus infection in healthy animals by stimulating the production of interferon.

2 Claims, No Drawings

ANTI-HERPES VIRUS TREATMENT

This is a continuation of U.S. Pat. application Ser. No. 54,022, filed July 10, 1970 now abandoned which application is a continuation-in-part of my copending U.S. Pat. application Ser. No. 716,257, filed Mar. 6, 1968, now abandoned which is in turn a continuation-in-part of my U.S. Pat. application Ser. No. 577,675, filed Sept. 7, 1966, now abandoned.

This invention relates to a method of suppressing herpes virus. More specifically, this invention relates to a method of inhibiting or retarding herpes virus growth and preventing its propagation by inactivation of the virus and/or increasing host resistance to the virus infection.

It has now surprisingly been discovered that certain water-soluble copolymers prepared from divinyl ether and maleic anhydride in mole ratios of 1:2 and their physiologically tolerated salts are effective as antiviral agents in various animals. The above mentioned copolymers are characterized by having an RSV of from about 0.04 to about 1.8 and as having the following recurring unit:

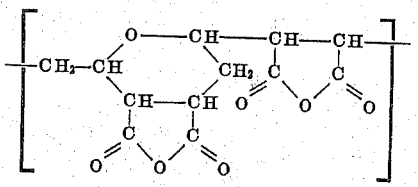

It will be obvious to those skilled in the art that these copolymers will hydrolyze on contact with water to produce the free acid.

The term "Reduced Specific Viscosity" (RSV), which is a function of molecular weight, is used herein to designate the specific viscosity measured at a temperature of 25° C. on a 0.1 percent solution of the copolymer in a one molar aqueous solution of sodium hydroxide.

Unlike some antiviral agents, the copolymers used in this invention are relatively nontoxic. For example, when injected intraperitoneally in mice they were found to have an $LD_{50}$ of greater than 800 mg./kg. By the term "$LD_{50}$" is meant lethal dose to 50 percent of the animals being tested.

The copolymers can be employed in aqueous solution or dissolved in physiological sterile saline solution. In addition, various pharmaceutical preparations can be compounded which contain the active substance along with liquid or solid diluents. Solid preparations for extemporaneous dilution can be formulated employing various buffering agents as well as local anesthetics and other medicinal agents such as antibiotics, hypnotics, analgesics, etc., and inorganic salts to afford desirable pharmacological properties to the composition. Administration will be by one of the conventional intramuscular, subcutaneous, intravenous or intraperitoneal routes.

Divinyl ether-malei anhydride copolymer can be used to treat animals which are actuatlly infected with a virus or to immunize animals which may be exposed to a virus. Thus the co-polymer acts not only as a medication but as a prophylactic. In any case, dosages in the order of 0.5 to 300 mg./kg. daily of the copolymers are highly effective in inhibiting virus in animals and in increasing resistance to the disease in healthy animals by inducing the production of interferon. The specific dosage will depend upon the route of administration and duration of treatment. Since the active copolymers are stable and widely compatible, they can be administered in solution or suspension in a variety of pharmacological acceptible vehicles including water, propylene glycol, diethylcarbonate, glycerol, or oils such as peanut oil, sesame oil, olive oil, etc.

As stated above, the physiologically tolerated salts of the copolymers can be used in the process of this invention. Exemplary salts are the water-soluble salts of alkali metals as for example sodium, potassium, etc.; ammonium salts, salts of such amines as methylamine, dimethylamine, ethylamine, diethylamine, butylamine, aniline, methoxyamine, piperidine, morpholine, etc.; mixed salts containing ammonia and a primary or secondary amine, etc.

The copolymers used in the process of this invention can be produced by copolymerizing divinyl ether and maleic anhydride in an aromatic diluent at a mole ratio of about 1:2 using a free radical initiator (e.g. benzoyl peroxide, azo bis(isobutyronitrile), etc.). The use of chain transfer agents (i.e., $CCl_4$, $BrCCl_3$, etc.) in the copolymerization is optional.

The following example shows the preparation of a typical divinyl ether-maleic anhydride copolymer.

A polymerization vessel was charged with 197.2 parts of maleic anhydride, 704 parts of benzene and 1,276 parts of carbon tetrachloride. After dissolution of the maleic anhydride, the solution was sparged with nitrogen and 70.2 parts of distilled divinyl ether was added with agitation. Then with vigorous agitation there was added 1.45 parts of benzoyl peroxide dissolved in benzene. Within 20 seconds, copolymerization started and the solution became cloudy and then gelatinous. After about 3-½ hours, the swollen polymer was removed and repeatedly extracted with benzene and then dried under vacuum. The resulting divinyl ether-maleic anhydride copolymer had an RSV of 0.34 (molecular weight of approximately 36,000) and represented a conversion of 89 percent. The divinyl ether and maleic anhydride were present in the copolymer in the molar ratio of 1:2.

It will be understood that by conducting the copolymerization under various reaction conditions in the presence of different free radical initiators and in the presence or absence of chain transfer agents, copolymers of various molecular weights can be prepared.

The following examples are presented to illustrate the process of this invention.

EXAMPLE 1

This example illustrates the induced production of interferon by treating Swiss white mice with a divinyl ether-maleic anhydride copolymer containing divinyl ether and maleic anhydride in a 1:2 mole ratio and having an RSV of 0.34 (molecular weight of approximately 36,000). Six groups containing five mice each were all injected intraperitoneally with 125 mg./kg. body weight of the copolymer in sterile saline solution. The groups of mice were sacrificed as follows: the first group, immediately; the second after 12 hours; the third after 24 hours, the fourth after 48 hours; the fifth after 72 hours; and the sixth after 144 hours. The pooled mouse serum from each group was tested to determine the units of interferon produced according to the procedure of Kleinschmidt et al. P.N.A.S. 52: 741, 1964. The results of these tests are tabulated below along with results of control groups of five mice each injected with sterile saline solution alone:

| Hours | Units of Interferon Present Mice Injected with Copolymer | Controls |
|---|---|---|
| 0 | <10 units | <10 units |
| 12 | 90 units | " |
| 24 | 159 units | " |
| 48 | 25 units | " |
| 72 | <20 units | " |
| 144 | <20 units | " |

EXAMPLE 2

This example illustrates the production of interferon using divinyl ether-maleic anhydride copolymers of varying molecular weight. Four groups of Swiss white mice containing five mice each received intraperitoneal injections of 125 mg./kg. body weight of the copolymer in sterile saline solution with each group receiving a different molecular weight copolymer. All of the mice were sacrificed 24 hours after treatment and the pooled mouse serum from each group tested to determine the units of interferon present as described above. The results of these tests are tabulated below:

| Divinyl ether-maleic anhydride molecular weight | Units of Interferon Present |
|---|---|
| 17,000 | 187 |
| 40,000 | 219 |
| 110,000 | 246 |
| 450,000 | 205 |

EXAMPLE 3

This example illustrates the induced production of interferon in human patients upon administration of a divinyl ether-maleic anhydride copolymer containing divinyl ether and maleic anhydride in a 1:2 mole ratio and having a molecular weight of approximately 17,000. Six human patients were administered intravenous infusions of the copolymer in sterile saline solution. In each case the injections were 100 cc., the difference being in the concentration of the copolymer present. Dosages varied from 12 mg./kg. body weight to 16 mg./kg. body weight and administration from a single injection to two injections. In each case from about 5 cc. to about 20 cc. of serum were removed from the patient every 24 hours for 6 days beginning before the first administration of the copolymer. Each sample of serum was assayed for interferon on human neonate foreskin fibroblasts in a plaque reduction assay employing bovine vesicular stomatitis virus as described in *Virology*, Vol. 29, pages 515–522 (1966). The mg./kg. of body weight of copolymer administered per injection, the number of injections, and the units of serum interferon/4 ml. are tabluated in Table V.

TABLE V

| | Dosage | | Serum interferon, units/4 ml. | | | | |
|---|---|---|---|---|---|---|---|
| Patient | Mg./kg. | Number of injections | Before treatment | After 24 hrs.[1] | After 48 hrs.[1] | After 72 hrs.[1] | After 96 hrs.[1] |
| A | 12 | 1 | 0 | 0 | 10 | N.D.[2] | N.D.[2] |
| B | 15 | 1 | 0 | 15 | 22 | 4 | N.D.[2] |
| C | 12 | 2 | 0 | 0 | 13 | 0 | 0 |
| D | 12 | 2 | 0 | 0 | 18 | 0 | 0 |
| E | 16 | 1 | 0 | 0 | 18 | 0 | 0 |
| F | 16 | 2 | 0 | N.D.[2] | 40 | N.D.[2] | 21 |

[1] In the case of the patients who received two injections, the hours were counted from the time of the first injection.
[2] Not determined.

EXAMPLE 4

This example illustrates the in vitro activity of a divinyl ether-maleic anhydride copolymer with herpes virus (M.R.S.). The copolymer used contained divinyl ether and maleic anhydride in a 1:2 mole ratio and had a molecular weight of approximately 3,700. The copolymer was dissolved 1 mg./ml. in 0.9 percent saline solution, mixed with an equal volume of freshly thawed herpes virus and incubated for 30 minutes at 37° C. Then, serial 10-fold dilutons of the resulting mixtures were dilutions in Hanks' solution and the residual infectivity determined by plating the diluted samples on rabbit kidney monolayers. The plaques were allowed to form under an agar medium at 4° C. and were then counted. The average count for copolymer treated virus was 50. A control treated exactly the same way except for the copolymer treatment gave an average count of 1,000,000.

What I claim and desire to protect by Letters Patent is:

1. A process of suppressing pathogenic herpes simplex virus growth which comprises administering to an animal infected with said virus a dosage effective for the treatment of herpes virus of a compound selected from the group consisting of divinyl ether-maleic anhydride copolymers and physiologically tolerated salts of divinyl ether-maleic anhydride copolymers, said copolymers containing divinyl ether and maleic anhydride in a mole ratio of about 1:2 and having a reduced specific viscosity of from about 0.04 to about 1.8.

2. A process of suppressing pathogenic herpes simplex virus growth which comprises inoculating an infected animal with at least one dosage of from about 0.5 to 300 mg./kg. of body weight of a compound selected from the group consisting of divinyl ether-maleic anhydride copolymers and physiologically tolerated salts of divinyl ether-maleic anhydride copolymers, said copolymers containing divinyl ether and maleic anhydride in a mole ratio of about 1:2 and having a reduced specific viscosity of from about 0.04 to about 1.8.

* * * * *